United States Patent Office 2,741,798
Patented Apr. 17, 1956

2,741,798

METHOD FOR PRODUCING ARTIFICIAL STONES FROM SLATE ASHES AND LIME

Bertil Carlen, Hallabrottet, Sweden, assignor to International Ytong Co. Aktiebolag, Stockholm, Sweden, a corporation of Sweden No Drawing. Application November 6, 1951, Serial No. 255,148

10 Claims. (Cl. 18—47.5)

The present application is a continuation-in-part of my copending application Serial No. 790,710, filed December 9, 1947, now abandoned. It relates back thereto for all subject matter common therewith.

This invention relates to the preparation of light-weight or porous, or so-called gaseous, concrete and specifically artificial stones and building blocks from slate ashes and lime, wherein the pores or gas bubbles are produced by hydrogen gas generated by inclusion of aluminum in the wet slurry. The invention particularly involves the improvement whereby a relatively small amount of sugar is included to accelerate the "porosation" (i. e. the development of pores), together with the requirement that active, that is to say unslaked, lime is present along with the sugar during the generation of the gas and the development of the porosity. The resulting products are considered part of the invention.

Gaseous concrete, as seen in the form of artificial stones, particularly as building blocks, has been prepared by mixing, in finely divided state, both burned slate ashes and a material having a surplus of lime, for example, quicklime (CaO), and some aluminum powder, with water, and thereby producing a plastic mass of porridge- or gruel-like consistency. Slate ashes are very rich in silicon dioxide ($SiO_2$) which reacts with the lime in the formation of the resulting concrete. Reaction between the lime and aluminum powder and water liberates hydrogen which forms the gas bubbles to give the plastic mass the desired porosity. As a result of, and thus during, the formation of the gas bubbles, the plastic mass increases its occupied volume. Hence, it has been said that the mass "moves," much like the movement or rising of a dough during its fermentation. Because of confinement by the vertical sides of the molds, this movement is usually in the vertical. Thereafter, the plastic mass is allowed to cure and harden, preferably in an autoclave at about 8 to 10 atmospheres' vapor pressure.

However, in the preparation of gaseous or porous concrete products such as artificial stones or blocks for building purposes, wherein the gas formation causes a substantial movement or extension in the vertical direction, it was found that the porosity of the obtained gaseous concrete was not uniform particularly because the bubbles at least in the lower parts of the stone are flattened by the pressure of the weight of the rest of the stone above them. This flattening effect on the bubbles in some parts of the stone not only contributes an undesirable lack of uniformity in the stone, but also palpably reduces the strength of the stone.

Attempts have been made to overcome these disadvantages, for example, by incorporating into the moist plastic mass, or admixing with the starting materials, so-called bubble strengthening substances. A favorite of such substances or means was the use of an excess of cement, because the cement, if sufficiently active, binds the mass so rapidly that its movement during the formation of the bubbles is exactly, or so nearly, completed by the time the cement has imparted to the mass sufficient strength that no compression of the lower parts under the weight of the rest of the mass above them can occur.

It has also been proposed to use sugar in very small quantities as the bubble strengthening substance, but it occurs that sugar gives no, or only a very small, bubble improving effect when added in quantities small enough not to interfere with, or jeopardize, the solidification of the product. When sugar is added in larger quantities, a better bubble strengthening or improving effect is noticed, but instead the inherent internal strength of the product is reduced to a degree that usually cannot be tolerated.

According to the invention, sugar together with an adapted, or suitable, quantity of active lime, such as quicklime is used as the bubble improving or gas strengthening substance. As essential to the invention, it has been found that both the active (i. e. unsaturated or unslaked) lime and the sugar must be present together, and that the active or unsaturated lime must be present for the sugar to function properly, and at the time that the gas is being generated in the reaction mass and the porosity is being developed; that is to say, the sugar and the unslaked lime are present simultaneously, and at the moment of, and during the "porosation," or stated otherwise, before the concrete has become bound or hardened.

Slate ashes is a very stable product, as is also slaked lime, at least insofar as is concerned the formation of a calcium silicate by their interaction, which by prior methods was seen to manifest too slow a rate of reaction. Then, according to the invention it was discovered that unexpectedly advantageous acceleration of the desired interaction between the slate ashes and the unsaturated or unslaked lime occurred, and only, when the unslaked lime was present together and along with the sugar and during the "porosation" so that the influence of each of these two agents could be manifested on the other of them to accelerate the making of the desired porous or lightweight product.

In operations according to the process of the invention it was found that the presence of the active, or unsaturated lime, or quicklime promoted an essential acceleration of the coming on and development of the bubble improving activity of the sugar, and, as a matter of fact, it thereby fully eliminates, or at least reduces to a negligible magnitude, the possible suppression of the bubbles. The presence of the unslaked lime and the sugar together, and during the "porosation," contributes a very remarkable increase in strength to the porous, lightweight concrete produced. With good quality starting materials this has been observed to be about 50 percent greater strength for the same specific weight than lightweight concrete produced from the same materials by the other methods. With no unsaturated or unslaked lime present the strength decreases.

The active or unsaturated lime, the presence of which is essential at the development, and during the production, of the pores, can be introduced in various ways into the production batch for that purpose. It can be introduced together with the slate ashes, in which case both of these materials should be kept dry and advantageously are dry ground together. In that case it is suitably desirable that no slaked or saturated lime, i. e. $Ca(OH)_2$, be added, and advantageous that the sugar be dissolved in the water to be used in preparing the plastic mass. Alternatively, it is also possible, for example, to add the active or quicklime separately after the plastic mass has been preliminarily prepared.

Thus, considered broadly, the method of the invention embraces the preparation of porous (i. e. lightweight or gas) concrete from slate ashes and lime, and the water necessary to promote the binding reaction between the slate ashes and the lime and the expansion of the initial volume of the material used by the formation of gas bubbles by an expansion gas generated in the reaction mass by the presence in it of an agent reacting on it to liberate such gas, which preparation comprises introducing sugar into the reaction batch and also introducing lime into it as active lime, and generating the expansion gas in the batch in the simultaneous presence of the sugar and the lime and while the lime is still unsaturated. The reaction batch is vigorously agitated uniformly to intermingle the ingredients, and the agitation is continued for about a few minutes after all ingredients have been added. While the "porosation" starts after all the ingredients are in, it is not completed at the end of the two or three minutes of agitation which is then usually discontinued and the batch transferred to molds where the plastic mass is left for its volume to expand further under the continuing generation of expansion gas, for a time sufficient for the volume expansion to be substantially completed.

The time required for the "movement" or expansion of the mass varies dependent on the quality of slate ashes and of lime used, and with a good grade of each of them, such as exemplified in Tables I and II below, the total time of movement will be from about ten minutes to about not more than fifteen minutes.

*Table I.—Analyses of good lime*

| Sample No. | 1 | 2 | 3 | 4 |
|---|---|---|---|---|
| Hydrochloric acid insoluble........percent.. | 6.2 | 6.1 | 1.4 | 14.2 |
| $Al_2O_3$ and $Fe_2O_3$ ....................do.... | 14.6 | 17.7 | 1.7 | 2.1 |
| CaO........................................do.... | 72.5 | 68.5 | 94.0 | 78.9 |
| MgO........................................do.... | 1.4 | 1.3 | 1.3 | 1.0 |
| $CO_2$........................................do.... | 1.0 | 0.4 | 0.7 | 1.5 |
| Unidentified inactive matter..........do.... | 4.3 | 6.0 | 0.9 | 2.3 |

*Table II.—Analyses of good slate ash*

| Sample No. | 1 | 2 | 3 | 4 | 5 |
|---|---|---|---|---|---|
| $SiO_2$.........................percent.. | 60.4 | 58.1 | 57.9 | 58.5 | 51.6 |
| $Al_2O_3$..............................do.... | 15.8 | 16.9 | 16.9 | 17.3 | 14.3 |
| $Fe_2O_3$..............................do.... | 9.9 | 10.3 | 10.0 | 11.1 | 9.7 |
| FeO..................................do.... | 1.2 | 1.5 | 1.8 | 0.7 | 0.7 |
| CaO..................................do.... | 1.4 | 1.8 | 1.9 | 1.6 | 6.0 |
| MgO..................................do.... | 1.3 | 1.3 | 1.3 | 1.4 | 1.1 |
| $K_2O$..................................do.... | 5.2 | 4.6 | 4.6 | 4.9 | 4.7 |
| $Na_2O$................................do.... | 0.5 | 0.3 | 0.4 | 0.3 | 0.5 |
| $SO_3$..................................do.... | 2.1 | 2.8 | 2.6 | 1.8 | 3.8 |
| S......................................do.... | 0.5 | 0.7 | 0.8 | 0.3 | 0.3 |
| Loss on Ignition................do.... | 2.0 | 2.5 | 2.8 | 2.2 | 4.9 |

The expanded mass in the mold is then left to "dry," or in other words, for the setting in of the preliminary set and the development of its plastic consistency, which it acquires in from about 2 to about 4 hours. Incidentally, the "drying" time of the mass is a very important clue to show whether unsaturated lime was present together with the sugar at the time of the "porosation," for if only saturated lime, and no unsaturated lime, were present at that moment, a much longer "drying" time would be required, with the consequence that the finished product would show a much lower strength. After the "drying" the excess porous mass above the top edges of the mold is removed. Such excess can be returned to the mixer for inclusion in a succeeding batch, but preferably not to exceed ten percent of the total charge.

The remaining contents of the molds are then cut by suitable means to form the desired dimensioned blocks or stones, which consumes 2 or 3 minutes. Immediately thereafter, the mold with its contents is placed in an autoclave wherein the steam pressure is continuously gradually raised to a maximum of about ten atmospheres over a period of from about 2 to about 3 hours. The maximum pressure is maintained for about 12 to 14 hours when, after the stones have hardened, the pressure is similarly continuously gradually released also over a period of about 2 to 3 hours. The molds are then removed from the autoclave and opened to release the finished blocks ready for use.

As starting material a good lime of the type exemplified in Table I can be used. The most suitable are the hydraulic limes. Pure limes are ordinarily not apt to give a good gas concrete when mixed with slate ashes. The more hydraulic the lime is the more rapidly it will combine with the slate ashes. It is important that the main union of the lime with the slate ashes should not start until directly after the "movement" or expansion of the mass under the influence of the expansion gas bubbles is actually terminated. It is in this situation that the simultaneous presence of the sugar together with unsaturated lime, during the "porosation" contributes its valuable advantage in that it has so accelerated the "porosation" that it is assured that it is terminated before the union between the lime and the slate ashes commences. This acceleration of the "porosation" when the sugar is present during it along with unsaturated lime can be observed from outside of the mass by measuring its temperature which increases at a much more rapid rate due to the acceleration of the reaction.

The generation of the expansion gas can be promoted by any compatible agent that will liberate a suitable expansion gas under the reaction conditions. However, hydrogen generated by the reaction of the alkaline lime with an amphoteric metal in the presence of the water is particularly advantageously effective. Under present practice aluminum serves as the most effective amphoteric, hydrogen-gas-generating metal. However, zinc can also be considered and also magnesium and other amphoteric metals, for example, antimony, molybdenum and scandium, which are not quite as effective as the three first three mentioned, and also tin, titanium, vanadium, and yttrium, which four are not quite as effective as the second three. Any suitable mixture of any of the effective amphoteric metals can be used and such mixtures are intended to be embraced by the claims whose language does not necessarily restrict the use to solely a single such metal.

The amphoteric, hydrogen-gas-generating metal is used in the reaction batch in an amount or proportion sufficient to give the desired degree of development of pores or gas bubbles to provide the specific density of lightweight block to be produced. That can readily be determined by one or more simple, laboratory check runs with the particular ingredients to be used in the production batch. Generally, the aluminum or other amphoteric, hydrogen-gas-generating metal is included in but a relatively small proportion of the total charge of all the materials used in the batch. At least usually, exemplified by aluminum it is included as a small fraction of a percent ordinarily under one-tenth of a percent and customarily under one-twentieth of a percent and commonly about 0.04 percent, and then under one-tenth percent of the total of lime and slate ashes content of the batch and often between about 0.06 and 0.07 percent of their joint content.

Obviously, the slate ashes and lime jointly constitute the largest part of the batch and their joint specific part of it is influenced by the specifications for the finished product and is thus ordinarily within the judgment of the worker skilled in this art. At least usually they jointly make up the major portion of the total batch content of all materials and with the average good grade of slate ashes and unslaked lime, for example, of the types shown in the Tables I and II, comprise in the neighborhood of about 60 percent of the total batch, more or less.

Likewise, the ratio of slate ashes to unslaked lime will vary according to the specifications set for the end product. Practically always the slate ashes are taken in a much greater amount than the active lime and as often to the extent of somewhere around at least a few times that of the lime. For example, with slate ashes and active limes of the types shown in Tables I and II good results are obtained by using about four parts of slate ashes to one part of the lime. Each of the two of them is usually kept in stock in its own silo and in lumps desirably no greater than an inch in its largest dimension. When a batch of lightweight concrete is to be run, the respectively required amount of each is taken and they are mixed and jointly ground to a fine size effectively to about 70–75% to pass through a screen with 0.09 millimeter free mesh width. Usually the fineness to which they are ground is called "atomic" fineness, by which is meant that about 35 percent will pass through a screen of 10,000 meshes per square centimeter so that no more than 65 percent is retained on such screen after passing through the screen of next larger mesh openings. In the modification of the method wherein the active lime is added alone after the mass has been preliminarily prepared from the other ingredients, the lumps of the two main solid ingredients are not mixed. However, each is separately ground to the degree of fineness just indicated.

At least usually, the quantity of water used is greater than that of the lime and closer to, and less than that of, the slate ashes, and ordinarily, say, for the lime and slate ash types of Tables I and II, under half of the total of all materials in the batch and in the order of around 40 percent of it and less as around possibly 35 percent or more as to about 45 perhaps. The amount will depend on the activity of the lime, being greater for the more active unslaked limes, and vice versa.

Any kind of sugar, or mixtures of any of them, can be used, although some are more effective than others. Thus far, ordinary food sugar has been found to be the best, and could be cane, beet, or sycamore sugar. Like the amphoteric metal, the sugar also is included in a relatively very small proportion, although greater than the metal, and running possibly from about four to about five times the proportion of the metal. Thus, while the sugar is used in a proportion to promote adequate acceleration of the "porosation" for the "movement" or expansion of the plastic mass to be completed at least before the binding or setting occurs between the slate ashes and the lime, it should be below an amount that would cause undesirable reduction in the available strength for the end product. It generally will also run under one percent of the total content of all materials in the batch, and usually well under one-half percent, and, with the materials shown in the Tables I and II, in the range of about one-seventh to one-sixth of a percent, and about 0.16 percent, or from about one-fifth to about three-eighths percent of the total of slate ashes and lime, and at about three-tenths percent of it The various proportions of the individual ingredients can be determined by the operators for the various individual batches of the particular ingredients selected and their qualities, guided by the various respectively suggested ranges, by one or more ready simple laboratory check tests when necessary to have an indication that the desired properties will be obtained in the end product. Where indicated suitable changes in the quantity of one or the other of them can be made as influenced by the skill in the art and experience with the process, for the amount of any specific constituent that gives optimum improvement will vary with the type and quality of slate ashes and of active lime used. The process of the invention may be illustrated by, but not restricted to, the following example:

EXAMPLE

The supplies of slate ashes and burned lime (i. e. quick or unslaked lime) are stored separately each in its own respective silo, after each has been crushed to pieces preferably no greater than an inch in the largest dimension. From such stock 170 kilograms of the line and 680 kilograms of the slate ashes are taken and ground together to so-called atomic fineness. 2.5 kilograms of raw sugar (ordinary food sugar) are dissolved in 550 liters of tap water in a mixer. When the sugar solution is homogeneous, there is mixed into it under rapid agitation, the 850 kilograms of the ground mixture of active lime and slate ashes, fed to the mixer by a screw conveyor and as rapidly as possible to permit the very active agitation. While still agitating the mixture and immediately after the ground mixture of active lime and slate ashes has been fed to the mixer, 550 grams of powdered aluminum metal are added and thereby uniformly distributed in the mixture.

The agitation is continued for over two, and under three, minutes from the completion of the addition of a mixture of burned lime and slate ashes. Immediately after the termination of the mixing period, the still pourable plastic mass is poured into molds where the development of the pores or gas bubbles, which started immediately upon the addition of the aluminum, and the corresponding "movement" of the mass, that is to say, the increase in its volume, continues for just under fifteen minutes. The mass in the mold is then left to "dry," that is, for the setting in of the preliminary bond and the development of its plastic consistency over the period of about three hours. The excess of porous mass above the top edges of the molds is then cut or scraped off. The batch thus gives a total of 1.5 cubic meters of expanded material from which stones can be cut.

After removing the excess above the top edges of the molds, the mold contents are cut to form the desired sized stones or blocks for use as building material. Advantageously the cuts for that purpose are so arranged and spaced so that when the separated stones or blocks are to be used for building they must be turned through an angle of ninety degrees from the vertical to the horizontal to fit into the necessary arrangement.

The mold with its contents is then placed in an autoclave to be steam hardened and the pressure on them in it is gradually increased to attain the maximum of about 10 atmospheres in about two and one-half hours. That maximum pressure is then maintained for twelve hours, after which the pressure is in turn gradually reduced in about two and one-half hours to atmospheric. The molds are then taken from the autoclaves and removed from the stones or blocks which are now ready for use.

In place of the aluminum in the example, some other amphoteric metal could be used, or a different sugar, with the slight modifications indicated by the difference in atomic weight of the metal, or guided by easy laboratory check test if indicated.

Tests with the method of the invention have shown that it will always develop some strengthening of the bubbles and that the extent of strengthening will vary with the type of active lime used in preparing the mass. Hydraulic limes, as a rule, are better adapted to form a strong artificial building stone of the type here involved, and consequently develop a greater improvement in the bubbles strength when used in the process of the invention. Some other types of unslaked limes will not be quite so effective, and still others may yield with slate ashes a still less effective gas concrete. These will require a somewhat longer hardening time than is needed with the better starting materials. Thus the lower speed of reaction will also influence the bubble improving effect, and tend to reduce it.

In any event, many slaked limes which could not be used at all in the prior methods for the production of gas concrete, because of their too low activity, nevertheless can be used in the process of this invention and yield an acceptable end product even if it is not the equal of that obtained when first-class starting materials are used. As already indicated, with the latter, especially with respect to the lime, substantial enhancement of the compressive strength of the blocks has been obtained, even up to approximately twice that obtainable by prior methods.

A particular part of the invention resides in the so-called cross-moved, gas concrete products. These are cut for use, while in their molds, so that the line of the direction of "movement" or expansion of the mass during its processing runs parallel to the base (i. e. the surface that is horizontal) of the product when it is used in building. These cross-moved gas concrete blocks exhibit an appreciably substantially greater compressive strength in a vertical wall than is observed with similar blocks that are not cross-moved. Heretofore, for practical reasons, the practice has been to cut the molds to yield blocks which when used in building have the line of direction of expansion parallel to the vertical direction of the wall. Accordingly, as indicated in connection with the illustrative example, to retain the present standard dimentions of gas concrete building blocks, the stones are cut in the molds, and remain in them in the autoclaves, with their longest dimension vertical. Thus, the load on the lower bubbles is thereby more than double that produced by the earlier methods.

While the invention has been described in relation to certain specific embodiments of it, it is understood that various modifications and substitutions may be made in it within the scope of the appending claims which are intended to include equivalents.

What is claimed is:

1. The preparation of porous artificial stone, such as the so-called gas concrete, which comprises dissolving a relatively very small quantity of a sugar in a sufficient quantity of water to produce such stone from the ingredients to be added, and agitating together in that water slate ashes and an active lime, both in finely divided state, and a still smaller quantity, than the sugar, of an agent that reacts with the mixture to liberate an expansion gas for the resulting mass, and so timing the inclusion of the active lime and the sugar in the reaction mixture that both unslaked lime and sugar are present simultaneously in the mixture about when the expansion gas begins to form gas bubbles in the reaction mass and also while the gas bubbles are still forming in it and its porosity is being developed.

2. The preparation as claimed in claim 1, wherein the agent that reacts with the mixture to liberate an expansion gas is an amphoteric metal and the gas is hydrogen generated by reaction between the metal and the lime in presence of the water.

3. The preparation as claimed in claim 2, wherein the sugar is a food sugar.

4. The preparation as claimed in claim 3, wherein the amphoteric metal is a member of the class consisting of aluminum, zinc, and magnesium.

5. The preparation as claimed in claim 4, wherein the amphoteric metal is aluminum.

6. The method as claimed in claim 2, wherein the sugar is dissolved in the water, and the slate ashes and amphoteric metal are actively agitated in it, and the unslaked active lime is then added to the agitated mixture.

7. The method as claimed in claimed 1, wherein the sugar is dissolved in the water and the latter is actively agitated and the finely divided slate ashes and active lime are added to the agitated solution and the mixture agitated actively for about two to three minutes, and the agent to liberate the expansion gas is an amphoteric metal and is added as soon as the addition of the slate ashes and lime is completed, and the agitation continued for the balance of the two to three minutes, and thereafter the mixture is poured into molds to permit the gas formation to continue in the no longer agitated mass.

8. The method as claimed in claim 7, wherein the respective required amounts of slate ashes and active lime are each taken in lump form and mixed in dry form and finely ground together and as thus mixed together added to the water.

9. The method as claimed in claim 1, wherein the expansion gas generating metal is an amphoteric agent and within a few minutes after the expansion gas has started the formation of gas bubbles in the reaction mass, the latter is poured into molds to allow the mass to expand until the gas generation terminates, and then through cuts are made in the plastic mass to outline the shapes of the finished blocks desired and the plastic mass is still maintained in one piece to harden.

10. The method as claimed in claim 9, wherein the cuts are made in the plastic mass in such arrangement that what will be horizontal surfaces in the finished individual blocks are vertical surfaces as remaining in the hardening mass.

References Cited in the file of this patent

UNITED STATES PATENTS

| | | |
|---|---|---|
| 1,107,286 | Gersabeck | Aug. 18, 1914 |
| 1,720,032 | Brookby | July 9, 1929 |
| 1,871,193 | Nelson | Aug. 9, 1929 |
| 1,819,018 | Eriksson | Aug. 18, 1931 |
| 2,087,550 | Rice | July 20, 1937 |
| 2,376,414 | Billner | May 22, 1945 |
| 2,545,323 | DuFour | Mar. 13, 1951 |

FOREIGN PATENTS

| | | |
|---|---|---|
| 146,172 | Great Britain | Apr. 21, 1921 |
| 235,006 | Great Britain | June 11, 1925 |
| 258,073 | Great Britain | Sept. 16, 1926 |
| 480,681 | Great Britain | July 25, 1936 |
| 502,780 | Great Britain | Mar. 24, 1939 |

OTHER REFERENCES

Sweetened Mortar Declared Stronger, The Washington Post, Wednesday, March 30, 1932.